United States Patent
Wu et al.

(10) Patent No.: US 6,759,114 B2
(45) Date of Patent: Jul. 6, 2004

(54) LIGHT WEIGHT BOARD OF IMPROVED SURFACE FLATNESS AND PROCESS FOR PRODUCTION THEREOF

(75) Inventors: Phillip C. L. Wu, Victoria, TX (US); Yao Cheng, Port Lavaca, TX (US); Haur Horng Yang, Victoria, TX (US); Jyh-yao Raphael Li, Parsippany, NJ (US)

(73) Assignee: Inteplast Group, LTD, Livingston, NJ (US)

( * ) Notice: Subject to any disclaimer, the term of this patent is extended or adjusted under 35 U.S.C. 154(b) by 127 days.

(21) Appl. No.: 10/039,809

(22) Filed: Oct. 27, 2001

(65) Prior Publication Data

US 2003/0082346 A1 May 1, 2003

(51) Int. Cl.$^7$ .............................. B32B 3/20; E04C 2/34
(52) U.S. Cl. ................. 428/178; 428/188; 428/313.3; 428/314.4; 52/793.1
(58) Field of Search ................................ 428/166, 178, 428/304.4, 120, 188, 314.4, 409, 313.3; 52/793.1

(56) References Cited

U.S. PATENT DOCUMENTS

| | | | | |
|---|---|---|---|---|
| 3,525,417 A | * | 8/1970 | Giraudeau | 428/188 |
| 5,366,789 A | * | 11/1994 | Mackinnon | 428/188 |
| 5,478,627 A | * | 12/1995 | Hara et al. | 428/156 |
| 6,284,346 B1 | * | 9/2001 | Sheridan | 428/156 |

* cited by examiner

*Primary Examiner*—Donald J. Loney
(74) *Attorney, Agent, or Firm*—Kenneth P. Glynn, Esq.

(57) ABSTRACT

An extruded hollow thermoplastic board, which includes a pair of flat and parallel sheets spaced apart and interconnected by extending ribs, generally has a plurality of depression bands in the areas where the flat sheets and extending ribs are joined. The bands, which negatively affect the surface flatness, are especially apparent for crystalline thermoplastic materials. A hollow thermoplastic board, which effectively reduces the depth of the depression bands by inclusion of locationally fixed gas pockets in the rib area during production, is disclosed in the present invention. The hollow thermoplastic board of the present invention substantially enhances the surface smoothness and is highly beneficial to applications such as printing, lamination and graphic art. The present invention also provides a method for production of the hollow thermoplastic boards of smooth surfaces.

11 Claims, 6 Drawing Sheets

(Prior Art)

LIGHT WEIGHT BOARD OF IMPROVED SURFACE FLATNESS AND PROCESS FOR PRODUCTION THEREOF

BACKGROUND OF THE INVENTION

1. Field of the Invention

The present invention relates to extruded thermoplastic sheeting consisting of a pair of sheets or layers spaced apart and interconnected by extending ribs so that the interior of the boards contains a plurality of extending passageways. More particularly, it relates to thermoplastic sheeting consisting of a pair of sheets or layers, which are substantially parallel to each other and are interconnected by extending ribs. The hollow thermoplastic sheeting of the present invention significantly enhances the surface flatness of thermoplastic sheeting as compared to prior art products. The present invention also relates to the process and composition for production thereof.

2. Information Disclosure Statement

Hollow thermoplastic panels, which are made of thermoplastic resin, are widely used in the sign, lamination and graphic art applications. A number of processes for production are already known to those skilled in the art. The following references illustrate the state of the art in this field:

One method in the prior art, as described in U.S. Pat. Nos. 3,509,005, 3,664,906, 3,748,214 and 3,741,857, for the manufacture of such lightweight board integrally molds a sheet with a plurality of ribs extending from the surface of the sheet. Another sheet of plain structure or having a plurality of extending ribs from the surface of the sheet, can be bonded to the previous sheet by bringing the two sheets together under heat-softened conditions such that the two sheets heat bond to one another.

U.S. Pat. Nos. 5,910,226 and 3,837,973 use a method for the manufacture of hollow thermoplastic boards, which consists of two or three extruders. The material from the middle extruder is molded into shapes by a roller and is united with the films from the other two extruders into one member by fusing together while they are under heat-softened conditions.

A pressure is applied when the sheets are united together by fusion to establish connection at their mutually contacting parts, in the previous techniques. The hollow thermoplastic sheeting produced according to the previous techniques has a plurality of ridges arising from the flat sheet along the contacting lines of the flat sheets and ribs, which significantly affects the flatness of the surfaces.

U.S. Pat. Nos. 3,274,315, 3,792,951, 4,513,048 and 5,658,644 use a process, which integrally extrude the two sheets and the plurality of the ribs of the hollow thermoplastic board through an extrusion orifice having a corresponding orifice configuration. The extruded boards then enter a calibrator, which cools and shapes the dimension of the board. The boards manufactured by such method consisting of a pair of sheets or layers spaced apart and interconnected by longitudinally extending ribs so that the interior of the boards contains a plurality of extending straight passageways.

The plastic hollow lightweight boards manufactured by the above method do not show a plurality of ridges at the areas where the flat sheets and the extending ribs are joined. In contrast, the contacting areas sink to form a plurality of depression bands extending along the passageway direction, which negatively affect surface flatness. The depression bands are especially apparent for polymers of high crystallinity such as polypropylene, high-density polyethylene, etc. It is believed that the depression bands are due to the thermal contraction and crystallization of the polymeric material in the extending ribs.

The plurality of depression bands or ridges on the surfaces of the hollow thermoplastic sheeting are unfavorable in the applications such as printing and laminating substrates. When being used as a printing substrate, the plurality of ridges or depression bands of the hollow thermoplastic sheet surface on the printed graphic art, incur undesired reflection of light and negatively affect the printing resolution and quality. In addition, more printing ink per unit area and greater press pressure may be necessary to cover the areas around the depression bands or ridges, which increase ink consumption and may shorten the life spans of the printing plates or screens. While being used as a laminating substrate, the topology of the hollow thermoplastic sheeting may appear on the surfaces of the laminated films or sheets.

The hollow thermoplastic boards can be laminated with films or sheets of smooth surface to improve the surface flatness. However, the extra materials, including the films or sheets and the adhesives to glue the sheets or films to the hollow thermoplastic boards, and the additional laminating process substantially increase the cost of the hollow thermoplastic sheeting of smooth surfaces.

It is therefore the object of the present invention to provide a hollow thermoplastic board, which has improved surface smoothness and does not incur significant increase of production cost.

It is also the object of the present invention to provide methods and compositions to economically produce hollow thermoplastic boards of substantially improved surface smoothness.

The smooth hollow thermoplastic board consisting of a pair of sheets or layers, which are substantially parallel to each other and are interconnected by extending ribs, and the corresponding process for the production thereof disclosed in this invention are believed to be neither taught nor render obvious by the prior art.

SUMMARY OF THE INVENTION

An extruded hollow thermoplastic board is disclosed which has a pair of flat and parallel sheets spaced apart and interconnected by extending ribs. The extending ribs are foamed to expand and extend the rib sections of the hollow thermoplastic boards. The expansion of the rib section compensates the shrinkage of the rib sections due to thermal contraction and the crystallization of the thermoplastic material when it cools after exiting the extrusion die. Consequently, the depths of the depression bands on the surfaces of the hollow thermoplastic boards ax reduced. The surface smoothness is substantially enhanced, which is highly desirable for applications such as printing, lamination and graphic art. The present invention also provides methods for the manufacture of the hollow thermoplastic boards of smooth surfaces.

BRIEF DESCRIPTION OF THE DRAWINGS

The features of the present invention, which are believed to be novel, are set forth with particularity in the appended claims. The invention may best be understood by reference to the following description taken in conjunction with accompanying drawings, wherein like reference numerals identify like elements and wherein:

DETAILED DESCRIPTION OF THE PRESENT INVENTION

Figure 1:
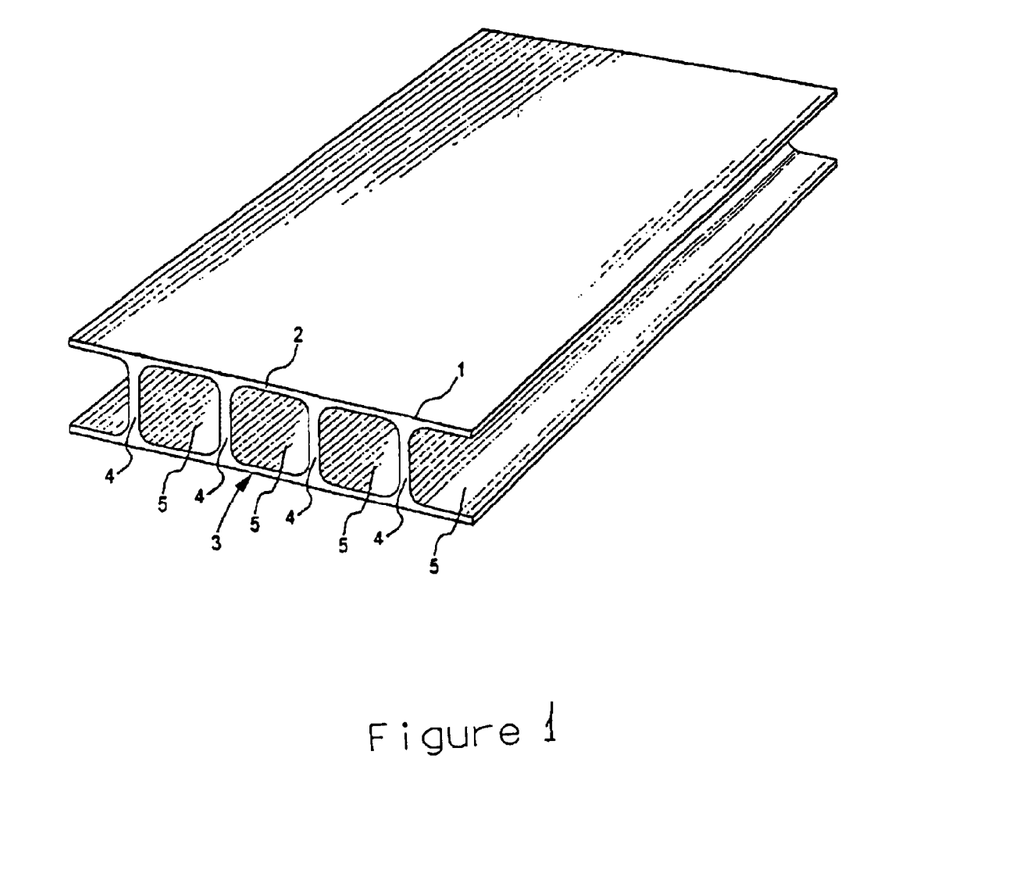
FIG. 1 is a perspective view of parts of hollow thermoplastic boards consisting of a pair of sheets or layers, which are spaced apart and interconnected by longitudinally extended ribs.

FIG. 1 illustrates a hollow thermoplastic sheeting of the present invention. The sheeting (1) includes a first planar sheet (2) and a second planar sheet (3), which is substantially parallel to the first planar sheet with the inwardly facing surfaces of sheets (2) and (3) integrally interconnected by a plurality of extending ribs (4). Within the sheeting, the combination of the inwardly facing surfaces of the sheets (2) and (3) and the adjacent surfaces of a pair of ribs (4) define elongated and rectangular passageways or ducts (5). The ribs (4) are generally formed of the same thermoplastic material as the sheets, except that the ribs (4) contain gas pockets or pores caused by a blowing agent entered into the process for the thermoplastic material for the ribs. The sheets (2) and (3) are generally free of a significant number of such gas pockets because, in preferred embodiments, no blowing agent is utilized in the thermoplastic materials used for the sheets (2) and (3).

Figure 2:
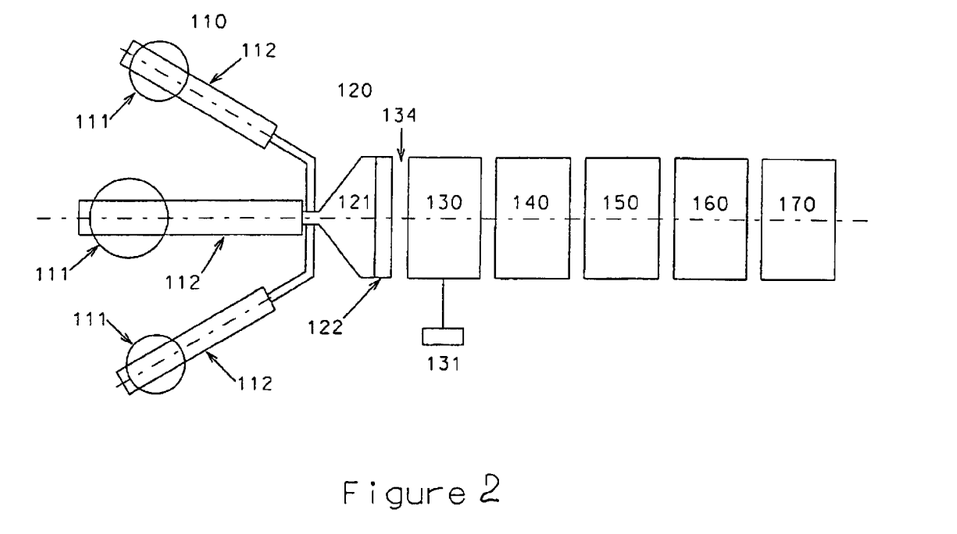
FIG. 2 is a schematic drawing of the process of the present invention for the production of hollow thermoplastic boards consisting of a pair of sheets or layers, which are spaced apart and interconnected by a plurality of extended ribs containing small gas pockets.

FIG. 2 illustrates a preferred embodiment of the present invention production process for manufacturing the hollow thermoplastic sheets of the present invention as described in FIG. 1 above. The production process includes an extrusion assembly (110), a die assembly (120), a sizer and cooling assembly (130), a haul-off unit (140), an annealing unit (150), a surface treatment unit (160) and apparatus for cutting the boards (170).

The extrusion assembly includes one or multiple extruders (112). Each extruder contains hoppers (111) which receive solid thermoplastic pellets or powders and other compositions that are directed into a barrel of a screw-type feeder where heat from the friction force or heater transforms, the thermoplastic material into a plastic state. The feeder moves the thermoplastic material from the feeding section towards the die assembly (120) and forces the thermoplastic material through the die assembly (120) to form boards of desired passageway structure. The molten extruded sheeting then travels through a short distance (134) to enter the sizer and cooling assembly (130), which cools and sets the shape and dimension of the sheeting. The sleeting exiting from the sizer and cooling assembly (130) passes between and is engaged by pairs of pulling rolls of the haul-off unit (140) which deliver the sheeting through annealing unit (150), the surface treatment unit (160) and the cutting device (170). The annealing unit (150) contains a heating oven to release induced stress and insure flatness of the board. The surface treatment unit (160) enhances the affinity of the surfaces of the hollow thermoplastic sheeting to printing ink, adhesives, etc. in order to have good bonding, while the cutting apparatus (170) cuts the sheeting into its final dimension.

The thermoplastic material of the hollow plastic boards, which can be made by the process of the present invention, depends on the application for which they are intended. The thermoplastic materials include polyolefins such as polypropylene, linear or branched polyethylene and copolymers thereof; polystyrene and styrene copolymer of various kinds; polyvinyl chloride and its copolymers; acrylic resins; polycarbonate; polyethylene terephthalate and its copolymers; and so on.

The composition of the thermoplastic material for the rib section also includes 0.01 to 5% of blowing agent that decomposes (activates blowing) at elevated temperatures. The proportion of the blowing agent in the composition of the thermoplastic material is adjusted according to the gas yield per unit weight of the blowing agent, the thermoplastic material, the extrusion devices, etc.

Any commonly used organic or inorganic blowing agent that decomposes when being heated can be used in this invention. The organic blowing agents, which can be used in this invention are azodicarbonamide, N,N'-dinitrosopentamethylene tetramine, N,N'-dinitroso-N-N'-dimethyl terephthal amide, benzene sulfonyl hydrazide, benzene-1,3-disulfohydrazide, terephthalic azide and the like. The inorganic blowing agents, which can be used in the present invention, are sodium bicarbonate, ammonium chloride and the like. The blowing agents, either organic or inorganic, can be used alone or in combination with other blowing agents in the present invention.

Though the chemical blowing agents are used as illustration in the subsequent description, high-pressure gases, such as carbon dioxide, nitrogen, etc. can also be used as blowing agents in light of the teaching. Modifications of the extrusion (110) and die (120) assemblies may be needed to use the gas blowing agents. These modifications could include gas injection ports to the barrels of the extruders, for example.

In addition to the blowing agents specifically being added to the extruded rib thermoplastic material, other ingredients, which are usually used as additives in the thermoplastic material, can be appropriately employed, in all of the thermoplastic material, if necessary or desirable. These ingredients include fillers, such as glass fiber, talc, calcium carbonate, etc., which are usually used in plastic material to reinforce the mechanical properties. In addition, colorants, antistatic agents, ultraviolet light inhibitors, smoke suppressants, flame retardant, etc. may be incorporated in the thermoplastic material to enhance specific properties of the sheeting of the present invention.

Suitable apparatus means for the plastifying and extruding of the thermoplastic materials are known in the art. Generally, the plastifying and extruding steps can be carried out in an apparatus such as a screw extruder (112). Single or multiple extruders can be used in the extrusion assembly. In the configuration of multiple extruders, different compositions can be used for respective extruders. Therefore first planar sheet (2), the second planar sheet (3) and the extending ribs (4) of the hollow thermoplastic sheeting (1) can perform respective functions or features.

Referring to FIG. 2, the thermoplastic resin and additives of suitable proportions are charged into the hoppers of the extruders (112), plastified within the cavities of extruders at temperatures above the fusion temperatures of the thermoplastic polymers. The plastified and melted thermoplastic masses are then extruded through a die head (121) and die lip (122) at the end of the extruders (112) to form sheeting consisting of a pair of layers spaced apart and interconnected by extending ribs.

Figure 3:
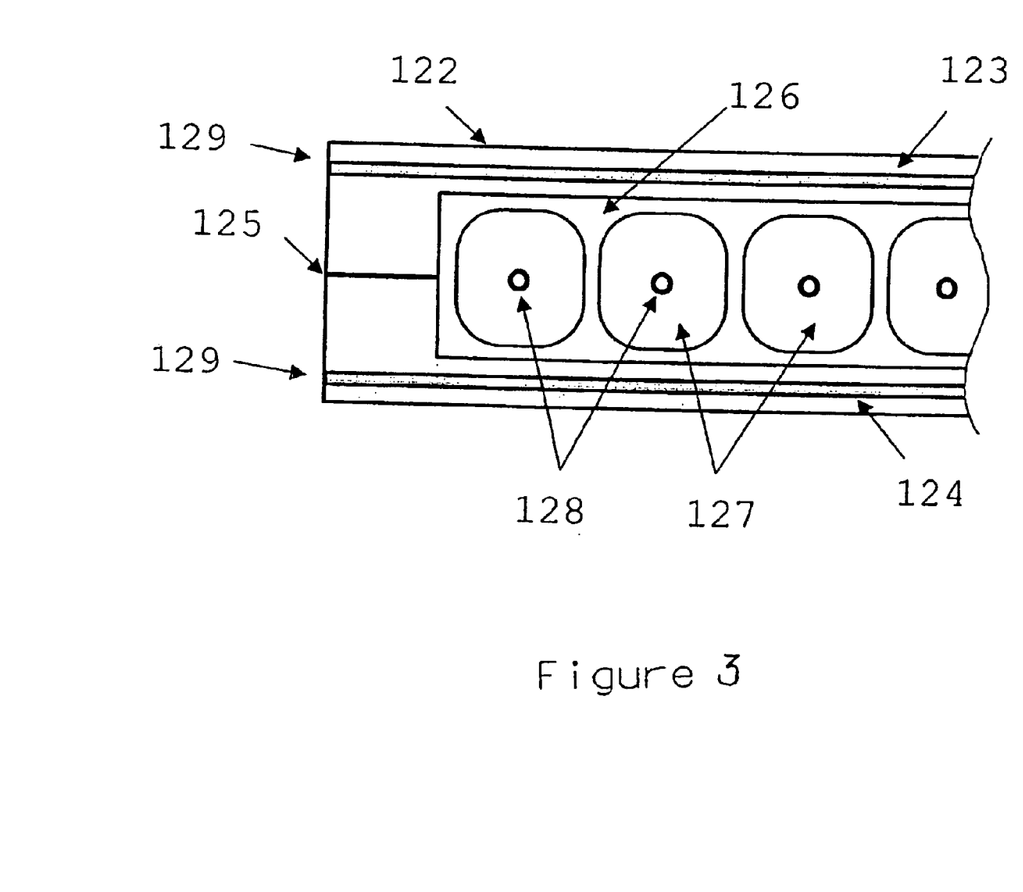
FIG. 3 is a sectional view of pans of the die lip which produces hollow thermoplastic sheeting which consists of a pair of sheets or layers, which are flat and substantially parallel, spaced apart and interconnected by extending ribs, which are substantially vertical to the two flat sheets.

Referring to FIG. 3, the die lip (122) contains upper and lower die sections (123), (124), each having an electrical heater (129). Die sections (123) and (124) are secured in face-to-face relation along line (125) to form die cavity (126). The cross-section of cavity (126) corresponds to the external shape of board (1). Die sections (123), (124) are provided with cutouts, which receive mandrels (127). The mandrels are connected to a transverse mandrel holder, which secures and positions the mandrel (127) across cavity (120). Longitudinal bores (128) in mandrels (127) are connected to a transverse bore in the mandrel holder which extends transversely through the mandrel holder and communicates with venting facilities which provides air flow through passageways of the board (1) during extrusion.

After the die section, the molten thermoplastic sheeting travels a short distance (134) to the sizer and cooling assembly (130). The sizer and cooling assembly (130) contains top and bottom platens, which are provided with a plurality of narrow slots, which communicate with manifolds and are perpendicular to the moving direction of the thermoplastic sheeting. The manifolds are connected to a vacuum source (131), so that the reduced pressure within manifolds cause extrusion layers (2) and (3) of the hollow thermoplastic sheeting to be forced against the two platen surfaces, respectively. Thereby preventing collapse of layers (2) and (3) during the period when layers (2) and (3) and ribs (4) are in a plastic or semi-plastic state and set the final dimension of the thermoplastic boards. In addition, cooling tubes are imbedded behind the surfaces of the upper and lower platens. Cooling water is circulated in the cooling tubes to cool the surface of the thermoplastic sheeting. The cooling water is regularly controlled at a temperature from about 1 to about 30° C. The sizer and cooling assembly cools and sets the dimension of the hollow thermoplastic sheeting. The continuously extruded sheeting is then pulled away from the sizer and cooling assembly (130) by a haul-off unit (140).

The hollow thermoplastic sheeting is in a soft and molten state, when it leaves the die lip (121), it maintains the same state in the short distance (134), and starts to solidify after entering the sizer and cooling assembly (130) The surfaces of the planar sheets (2) and (3), which are forced against the two platen surfaces, are quenched and rapidly solidified. The thermoplastic materials in the plurality of the extending ribs (4) and beneath the surfaces of the planar sheets (2) and (3) are slowly cooled since the thermoplastic material is a poor heat conductor.

When the thermoplastic material is cooled, it shrinks. The shrinkage is due to thermal contraction and is especially significant for thermoplastic material of high crystallinity in which portion of the thermoplastic material crystallizes to form compact crystalline structure from amorphous molten state when the temperature of the thermoplastic material drops below the crystallization temperature of the material.

Figure 4:
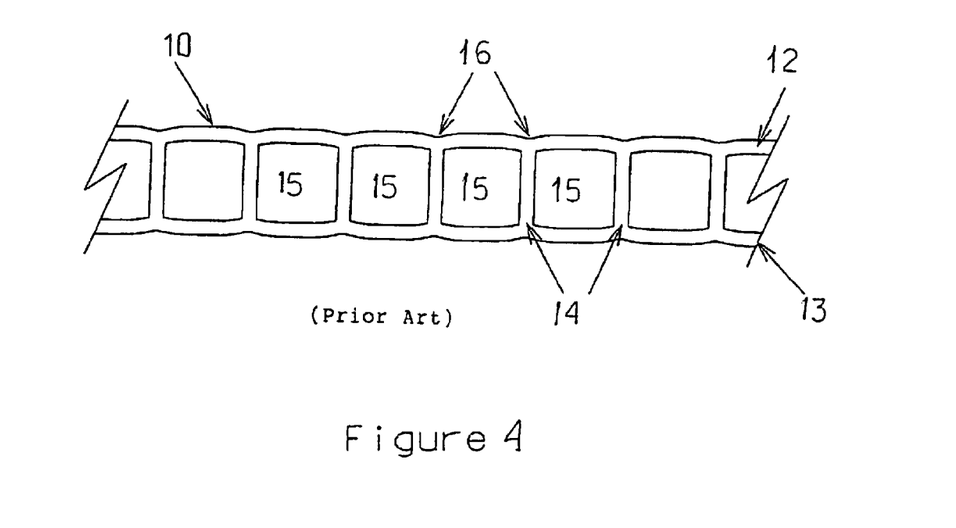
FIG. 4 is a sectional view of parts of a prior art hollow thermoplastic board, which shows a plurality of depression bands at the areas where the two flat sheets or layers and the extending ribs are joined.

In the prior art shown in FIG. 4, sheeting (10) includes a first planar sheet (12) and a second planar sheet (13) which are integrally connected by a plurality of longitudinal extending ribs (14), creating ducts (15) therebetween. The thermoplastic material in the plurality of extending ribs (14) thermally shrinks and crystallizes to shorten the length of the rib sections. The contractions of the extending ribs (14) pull the areas where the flat sheets (12) and (13) and the extending ribs (14) are joined while the vacuum of the sizer and cooling assembly forcing the surfaces of the planar sheets (12) and (13) against the two platen surfaces. The contraction results are shown in FIG. 4. It is believed that due to the contraction of the extending ribs (14), a plurality of depression bands (16) along the passageway direction are formed in the areas where the extending ribs (14) and the planar sheets are joined.

In the present invention, blowing agents are mixed in the thermoplastic material of the rib section. The blowing agents decompose in the extruder to generate gases. The gases from the blowing agent are dissolved in the thermoplastic mass in the extruder assembly (110) and die assembly (120) due to the high pressure inside the extruder and die. When the thermoplastic mass exits the die lip (122), the high pressure exerts on the thermoplastic mass inside the die is abruptly released. The gases in the rib section (4) of the thermoplastic sheeting (1) start to phase-separate from the thermoplastic mass to form bubbles.

The temperature of the thermoplastic mass beneath the skins (the core) of the hollow thermoplastic sheeting decreases slowly because thermoplastic material is a poor heat conductor so the heat removal in the mid section is slow. Before the temperature in the core drops below the solidification temperature, the gas in the thermoplastic mass phase separate from the thermoplastic mass and form bubbles in the mid section to expand and extend thermoplastic material in the ribs. The bubbles expand the length of the extending ribs (4). The expansion of the extending ribs compensates the shrinkage of the extending ribs due to thermal contraction and reduces the depth of the depression bands (6). When the temperature of the thermoplastic material in the rib section drops below the solidification temperature, the bubbles are trapped in the thermoplastic material to form small locationally fixed gas pockets.

Figure 5:
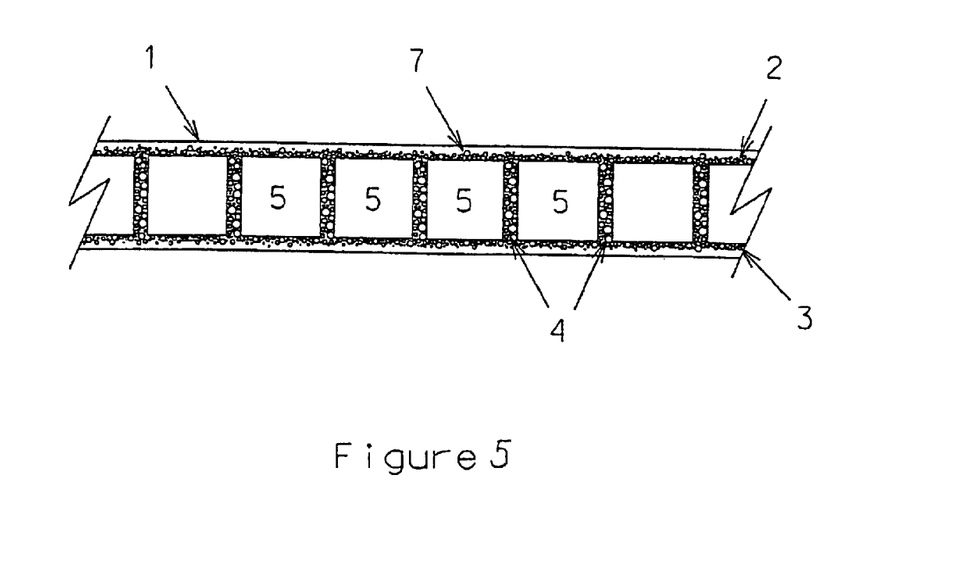
FIG. 5 is a sectional view of parts of hollow thermoplastic board of the present invention, which shows small gas pockets in the extending rib section.

Referring to FIG. 5, a higher degree of detail of the view shown in FIG. 1, the gas pockets or bubbles (7) are contained in the mid-section of the hollow thermoplastic sheets and do not appear on the outward facing surfaces of sheets (2) and (3). The outward facing surfaces of sheets (2) and (3) are quenched and solidified immediately after exiting the die assembly (120) by the sizer and cooling assembly (130). As a result, the gases dissolved in the thermoplastic material do not have sufficient time to separate from the thermoplastic material to form gas bubbles and the gas bubbles formed in the core section are held in the core section. Therefore, the surface skins of the hollow thermoplastic board (1) are solid and the gas bubbles do not negatively affect the smoothness of the surfaces.

The sheeting is pulled outwardly at a constant speed by a haul-off unit (140). The haul-off unit is similar to the conventional pulling means in the extrusion of sheeting, such as those employing a plurality of groups of wheels having a resilient cover or those employing friction belt imposed on the top and bottom surfaces of the sheeting. The engaging surfaces, such as resilient covering or belt, have an adjustable gap between the surfaces, therefore, can be adapted to accommodate to the respective thickness of the sheeting.

The hollow thermoplastic board is quenched from molten state in the sizer and cooling assembly (130). Stress is built in the quenching process, especially for crystalline polymers. To release the induced stress, the hollow thermoplastic sheeting is annealed in an oven (150). The annealing process insures the flatness of the thermoplastic sheeting.

After the hollow thermoplastic sheeting has left the annealing unit (150), the surfaces of the thermoplastic sheeting are surface treated with methods such as corona discharge, flaming, etc. The surface treatment removes the dust, greases, oils, processing aids, etc. on the surfaces. In addition, the surface treatment forms carbon—carbon double bonds, cabonyl and hydroxyl groups on the surfaces of the thermoplastic boards to increase the surface energy. As a result the surface wettability is enhanced to provide a good substrate with good bonding to printing ink, glues, etc.

The sheeting then enters cutting machine (160) such as guillotine, saw, slitter or the like and is cut at desired length. In a manner well known in the art, the guillotine, knife or blade of the cutting machine moves at the same speed as that of the sheeting during the period when the guillotine, knife or blade performs the cutting step.

Figure 6:
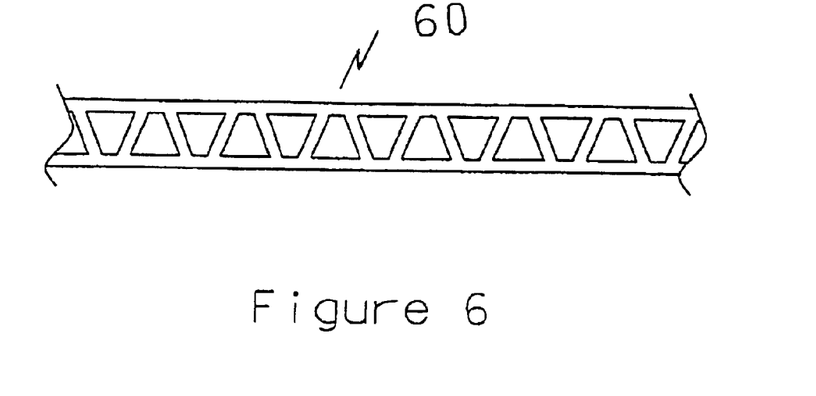
FIGS. 6 through 8 are sectional views of parts of several types of hollow thermoplastic boards, which can be made to improve the surface smoothness by the process of present invention.
Figure 7:
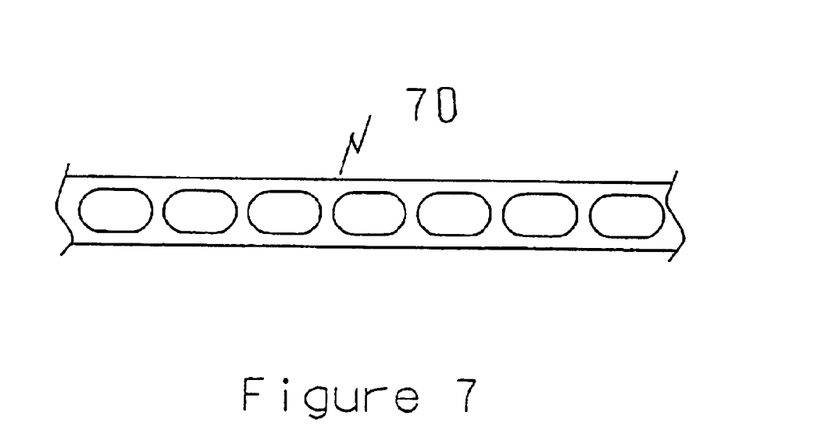
Figure 8:
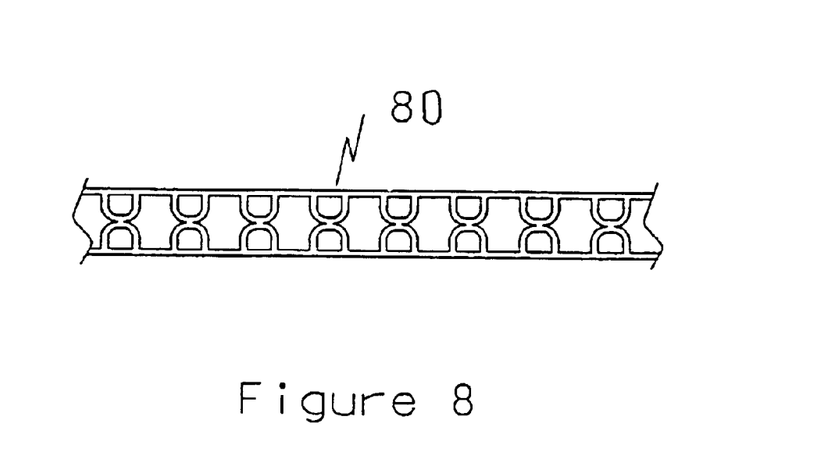

Though the hollow thermoplastic boards in FIG. 1, which contain two planar sheets spaced apart and interconnected by extending vertical ribs is used as illustration of the present invention in the previous descriptions, obviously, numerous modifications and variations of the configuration of the hollow thermoplastic boards are possible in light of the above teachings. FIGS. 6 through 8 are sectional views of parts of several types of hollow thermoplastic boards (60), (70) and (80), respectively, which can be made by the present invention. The examples in FIGS. 6 through 8 are illustrative of types of hollow thermoplastic boards can be made by the process of present invention and are not included as a limitation of the scope thereof.

Properties of Hollow Thermoplastic Sheeting

The surface properties of the hollow thermoplastic boards described in conjunction with the Examples below are measured according to DIN 4768. A Hommel T 1000 surface roughness tester scans a length of 15 mm in the cross passageway direction to determine the arithmetic mean roughness value, Ra. Several measurements on both sides of the surfaces are averaged to determine the surface roughness of the hollow thermoplastic sheets. Since the depression bands extending along the passageway direction, only the surface roughness in the cross passageway direction is measured.

EXAMPLES

The present invention will now be explained by the following examples.

The boards were produced using the above-mentioned production process. The properties of the boards obtained were measured by methods described in the previous section. The following examples are illustrative of the present invention and are not included as a limitation of the scope thereof.

Example 1

Prior Art

In the Example, the die configuration is as shown in FIG. 5. The thermoplastic material used is polypropylene with antistatic and ultraviolet protective additives and white pigment. An extrusion assembly contains three extruder is used. The thermoplastic materials for the three extruders are the same. The extrusion temperatures are between 150 and 240° C.

The thermoplastic materials from the three extruders enter a feed block device, which combines the three thermoplastic materials into a three-layer composite. The weight ratios for the top, core and bottom layers are 15, 70 and 15%, respectively. The top and bottom layers form the first planar sheet (12) and the second planar sheet (13) of the hollow thermoplastic sheeting (10). The core layer forms the plurality of extending ribs (14) and parts of planar sheets (12) and (13).

The three-layered thermoplastic material then enters the die assembly, which has temperatures ranging from 180 to 240° C. The temperatures across the die are usually higher in the edge sections and lower in the middle section. The board is later shaped and cooled in the sizer and cooling assembly at a temperature about 20° C.

Figure 9:
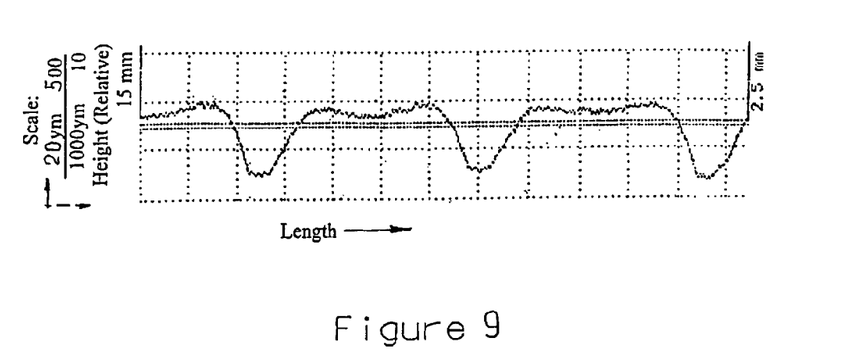
FIG. 9 is a plot, which shows the surface roughness of the hollow thermoplastic sheet in the prior art; and, FIG. 10 is a plot, which shows the surface roughness of the hollow thermoplastic sheet of the present invention.

The board produced has a thickness of about 4 mm and the weight per square meter is 750 grams. The arithmetic mean roughness value, Ra is $311 \times 10^{-6}$ inch. A plot of relative height versus length from HOMMEL T1000 surface roughness tester, which shows the topology of the produced hollow thermoplastic sheeting, is shown in FIG. 9.

Example 2

Present Invention

In this example, the production equipment and the thermoplastic materials used for the top and bottom skin layers are the same as those in Example 1. The extrusion temperatures for the top and bottom skin layers are between 150 and 240° C. 0.7% chemical blowing agent concentrate, which decomposes to generate carbon dioxide gas at elevated temperatures, is added in the composition of the core layer, which includes the rib section of the hollow thermoplastic sheeting. Due to the plasticization effect of the carbon dioxide gas, the extrusion temperatures for the core layer is about 10° C. below the settings in Example 1. In addition, the feeding zone temperature of the extruder has to be controlled below about 165° C. in order not to initiate the reaction of blowing agent before entering extruder. The temperatures of the die assembly are from 180 to 240° C.

Figure 10:
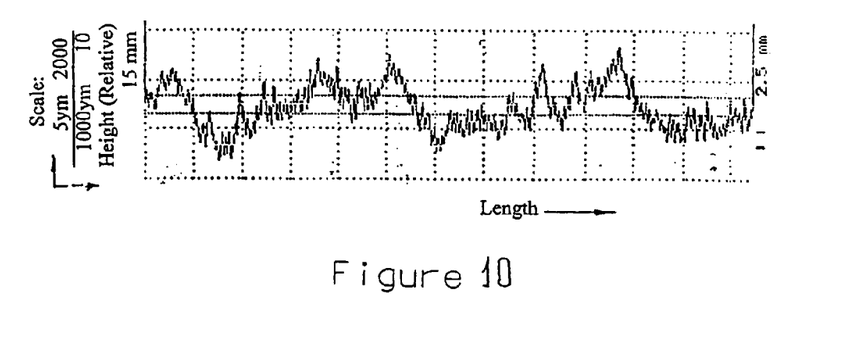

The hollow thermoplastic board produced has small gas pockets in the rib section as shown in FIG. 5 and has a thickness of about 4 mm and a weight of 750 grams per square meter. The arithmetic mean roughness value, Ra, is $81 \times 10^{-6}$ inch. A plot of relative height versus length from HOMMEL T1000 surface roughness tester, which shows the topology of the hollow thermoplastic sheeting, is shown in FIG. 10. It is worth noting that the y-scale in the plot of FIG. 10 ($5 \times 10^{-6}$ m) is four times more sensitive than the y-scale in FIG. 9 ($20 \times 10^{-6}$ m).

As can be compared from FIGS. 9 and 10 that the gas bubbles from the decomposition of the blowing agent in the rib section of the hollow thermoplastic sheeting effectively reduce the depths of the depression bands in the areas where the ribs and the planar sheets are joined. This significantly improves the surface smoothness of the hollow thermoplastic sheeting and reduces the arithmetic mean roughness values, Ra, from 311 to $81 \times 10^{-6}$ inch.

Obviously, numerous modifications and variations of the present invention are possible in light of the above teachings. It is therefore understood that within the scope of the appended claims, the invention may be practiced otherwise than as specifically described herein.

What is claimed is:

1. A light weight hollow thermoplastic board, which comprises:
    a first planar sheet;
    a second planar sheet; and,
    a plurality of ribs, each of said ribs having a plurality of fixed gas pockets located therein;
    wherein said fixed gas pockets are small closed bubbles forming a foamed extension to said ribs; and
    wherein said first planar sheet and said second planar are spaced apart by and are interconnected by said ribs.

2. The light weight hollow thermoplastic board of claim 1 wherein said board is formed in an integral form.

3. The light weight hollow thermoplastic board of claim 1 wherein said ribs are positioned at right angles to said first planar sheet and said second planar sheet and create rectangular cross-sectioned passageways therebetween.

4. The light weight hollow thermoplastic board of claim 1 wherein said ribs are positioned at angles other than right angles to said first planar sheet and said second planar sheet and create trapezoidal cross-sectioned passageways therebetween.

5. The light weight hollow thermoplastic board of claim 1 wherein said ribs are arcuated and create cross-sectioned passageways therebetween selected from the group consisting of elliptical and circular.

6. The light weight hollow thermoplastic board of claim 1 wherein said ribs are u-shaped.

7. The light weight hollow thermoplastic board of claim 1 wherein said board is made of a thermoplastic polymer selected from the group consisting of olefins, styrenes, vinyl chlorides, acrylics, polycarbonates and ethylene terephthalates.

8. The light weight hollow thermoplastic board of claim 1 wherein said thermoplastic polymer is selected from the group consisting of polypropylenes, linear polyethylene, branched polyethylene and copolymers thereof.

9. The light weight hollow thermoplastic board of claim 1 wherein said gas pockets are generated from a chemical reaction of a foaming agent.

10. The light weight hollow thermoplastic board of claim 1 wherein surface smoothness of said board is substantially enhanced by said foam expansion of said ribs.

11. The light weight hollow thermoplastic board of claim 10 wherein said surface smoothness of said board is conducive to printing and graphic art applications.

* * * * *

(12) EX PARTE REEXAMINATION CERTIFICATE (8110th)
United States Patent
Wu et al.

(10) Number: US 6,759,114 C1
(45) Certificate Issued: Mar. 22, 2011

(54) LIGHT WEIGHT BOARD OF IMPROVED SURFACE FLATNESS AND PROCESS FOR PRODUCTION THEREOF

(75) Inventors: Phillip C. L. Wu, Victoria, TX (US); Yao Cheng, Port Lavaca, TX (US); Haur Horng Yang, Victoria, TX (US); Jyh-yao Raphael Li, Parsippany, NJ (US)

(73) Assignee: Chiao Tung Bank, San Jose, CA (US)

Reexamination Request:
No. 90/010,541, May 15, 2009

Reexamination Certificate for:
Patent No.: 6,759,114
Issued: Jul. 6, 2004
Appl. No.: 10/039,809
Filed: Oct. 27, 2001

(51) Int. Cl.
*B29C 44/04* (2006.01)
*B29C 44/22* (2006.01)
*B29C 44/34* (2006.01)
*B32B 3/20* (2006.01)
*E04C 2/34* (2006.01)

(52) U.S. Cl. ............ 428/178; 428/188; 428/313.3; 428/314.4; 52/793.1

(58) Field of Classification Search .......... None
See application file for complete search history.

(56) References Cited

U.S. PATENT DOCUMENTS

| 3,220,595 A | 11/1965 | Edwards |
| 3,274,315 A | 9/1966 | Kawamura |
| 3,509,005 A | 4/1970 | Hartig |
| 3,664,906 A | 5/1970 | Hartig |
| 3,642,550 A | 2/1972 | Doll |
| 3,741,857 A | 6/1973 | Kakutani et al. |
| 3,748,214 A | 7/1973 | Withers |
| 3,792,951 A | 2/1974 | Meyers |
| 3,837,973 A | 9/1974 | Asakura et al. |
| 4,513,048 A | 4/1985 | Kaube et al. |
| 5,658,644 A | 8/1997 | Ho et al. |
| 5,910,226 A | 6/1999 | Moeder |
| 6,306,520 B1 | 10/2001 | Nagata et al. |
| 6,617,009 B1 | 9/2003 | Chen et al. |
| 2002/0011047 A1 | 1/2002 | Obeshaw |
| 2003/0215613 A1 | 11/2003 | Jan et al. |

OTHER PUBLICATIONS

Complaint for Patent Infringement against defendant Coroplast, Inc., with Exhibit A, dated Sep. 16, 2008.
Defendant Coroplast's Answer and Counterclaims against plaintiff Inteplast Group, Ltd. dated Apr. 14, 2009.
Plaintiff's Reply to Defendant's Counterclaim with Affirmative Defenses by Inteplast Group, Ltd. dated Apr. 21, 2009.
Motion to Stay Pending Outcome of Reexamination Proceedings Involving U.S. Pat. No. 6,759,114 by Defendant Coroplast, Inc. dated May 27, 2009.

(Continued)

*Primary Examiner* — Jerry D. Johnson (57) ABSTRACT

An extruded hollow thermoplastic board, which includes a pair of flat and parallel sheets spaced apart and interconnected by extending ribs, generally has a plurality of depression bands in the areas where the flat sheets and extending ribs are joined. The bands, which negatively affect the surface flatness, are especially apparent for crystalline thermoplastic materials. A hollow thermoplastic board, which effectively reduces the depth of the depression bands by inclusion of locationally fixed gas pockets in the rib area during production, is disclosed in the present invention. The hollow thermoplastic board of the present invention substantially enhances the surface smoothness and is highly beneficial to applications such as printing, lamination and graphic art. The present invention also provides a method for production of the hollow thermoplastic boards of smooth surfaces.

OTHER PUBLICATIONS

Memorandum in Support of Defendant's Motion to Stay Pending Outcome of Reexamination Proceedings Involving U.S. Pat. No. 6,759,114 filed by Defendant Coroplast, Inc, with Exhibit A, dated May 27, 2009.

Plaintiff's Memorandum in Opposition to Defendant's Motion to Stay Pending Outcome of Reexamination, with Exhibit A, dated Jun. 8, 2009.

Defendant Coroplast, Inc.'s Reply Memorandum in Support of Motion to Stay Pending Outcome of Reexamination Proceedings Involving U.S. Pat. No. 6,759,114, with Exhibits A and B, dated Jun. 18, 2009.

Court's Memorandum and Order dated Jun. 23, 2009.

Joint Notice of Action in Reexamination Proceedings Involving U.S. Pat. No. 6,759,114, with Exhibit A, dated Sep. 4, 2009.

Joint Notice of Office Action, with Exhibit A, dated Nov. 19, 2009.

Order staying matter before the Court, dated Nov. 30, 2009.

Letter from Kevin B. Laurence to David W. Harlan dated Dec. 2, 2008, with description of a declaration of Kenneth VanderVelde and associated attachments.

Declaration of Kenneth VanderVelde dated Dec. 1, 2008, with attachments.

US 6,759,114 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 63-Column 8, line 5:

Example 1

[Prior Art]

In the Example, the die configuration is as shown in FIG. 5. The thermoplastic material used is polypropylene with antistatic and ultraviolet protective additives and white pigment. An extrusion assembly *that* contains three extruder is used. The thermoplastic materials for the three extruders are the same. The extrusion temperatures are between 150 and 240 degree° C.

Column 8, line 28-line 46:

Example 2

[Present Invention]

In this example, the production equipment and the thermoplastic materials used for the top and bottom skin layers are the same as those in Example 1. The extrusion temperatures for the top and bottom skin layers are between 150 and 240 degree° C. 0.7% chemical blowing agent concentrate, which decomposes to generate carbon dioxide gas at elevated temperatures, is added in the composition of the core layer, which includes the rib section of the hollow thermoplastic sheeting. Due to the plasticization effect of the carbon dioxide gas, the extrusion [temperatures] *temperature* for the core layer is about 10 degree° C. below the settings in Example 1. In addition, the feeding zone temperature of the extruder has to be controlled below about 165 degree° C. in order not to initiate the reaction of blowing agent before entering extruder. The temperatures of the die assembly are from 180 to 240 degree° C.

AS A RESULT OF REEXAMINATION, IT HAS BEEN DETERMINED THAT:

The patentability of claims 2-6 and 8 is confirmed.

Claims 1, 7 and 9-11 are cancelled.

New claims 12-21 are added and determined to be patentable.

*12. A light weight hollow thermoplastic board, which comprises:*
*a first planar sheet;*
*a second planar sheet; and*
*a plurality of ribs, each of said ribs having a plurality of fixed gas pockets located therein;*
*wherein said fixed gas pockets are small closed bubbles forming a foamed extension to said ribs;*
*wherein said first planar sheet and said second planar are spaced apart by and are interconnected by said ribs; and*
*wherein said first and second planar sheets are of thermoplastic material generally free of gas pockets comprising closed bubbles.*

*13. The light weight hollow thermoplastic board of claim 12, wherein the thermoplastic material of the ribs contains a blowing agent and the thermoplastic material of the first and second sheets do not contain a blowing agent.*

*14. The light weight hollow thermoplastic board of claim 12, wherein the first and second sheets and ribs are formed as an integral extrusion.*

*15. The light weight hollow thermoplastic board of claim 12, further comprising depression bands in outer surfaces of the first and second sheets at locations corresponding to the ribs, the depression bands having depths and the ribs having lengths, and wherein the closed bubbles in the ribs expand the lengths of the ribs thereby to reduce the depths of the depression bands.*

*16. A light weight hollow thermoplastic board, which comprises:*
*a first planar sheet;*
*a second planar sheet; and*
*a plurality of ribs, each of said ribs having a plurality of fixed gas pockets located therein;*
*wherein said fixed gas pockets are small closed bubbles forming a foamed extension to said ribs;*
*wherein said first planar sheet and said second planar are spaced apart by and are interconnected by said ribs,*
*wherein said first planar sheet comprises a top skin layer of thermoplastic material generally free of gas pockets comprising closed bubbles and said second planar sheet comprises a bottom skin layer of thermoplastic material generally free of gas pockets comprising closed bubbles.*

*17. The light weight hollow thermoplastic board of claim 16, further comprising a core layer including said ribs, the core layer and top skin layer combining to form the first planar sheet, the core layer being a part of the first planar sheet, and the core layer and bottom skin layer combining to form the second planar sheet, the core layer being a part of the second planar sheet.*

*18. The light weight hollow thermoplastic board of claim 17, wherein the top and bottom skin layers and the core layer are formed as an integral extrusion.*

*19. The light weight hollow thermoplastic board of claim 17, wherein the top and bottom skin layers are made of the same thermoplastic material.*

*20. The light weight hollow thermoplastic board of claim 17, wherein the thermoplastic material of the core layer contains a blowing agent and the thermoplastic material of the top and bottom skin layers do not contain a blowing agent.*

*21. The light weight hollow thermoplastic board of claim 16, further comprising depression bands in outer surfaces of the top and bottom skin layers at locations corresponding to the ribs of the core layer, the depression bands having depths and the ribs having lengths, and wherein the closed bubbles in the ribs expand the lengths of the ribs thereby to reduce the depths of the depression bands.*

* * * * *